United States Patent [19]

Buchwald et al.

[11] 4,080,556

[45] Mar. 21, 1978

[54] COMPOUND D.C. ELECTRICAL MOTOR WITH SHUNT FIELD DEMAGNETIZATION PROTECTION

[75] Inventors: Frank S. Buchwald, Beachwood; Ward L. Bivens, Painesville, both of Ohio

[73] Assignee: Caterpillar Tractor Co., Peoria, Ill.

[21] Appl. No.: 656,569

[22] Filed: Feb. 9, 1976

[51] Int. Cl.² .............................................. H02P 7/00
[52] U.S. Cl. .................................. 318/526; 318/356; 318/532; 318/405
[58] Field of Search ............... 318/532, 526, 430, 405, 318/356, 459, 246, 250, 251, 426, 406, 331

[56] References Cited

U.S. PATENT DOCUMENTS

| | | | |
|---|---|---|---|
| 2,926,295 | 2/1960 | Allen | 318/356 X |
| 3,221,234 | 11/1965 | Ault | 318/350 |
| 3,504,256 | 3/1970 | Metcalfe | 312/246 |
| 3,792,326 | 2/1974 | First | 318/138 |

*Primary Examiner*—B. Dobeck
*Attorney, Agent, or Firm*—Phillips, Moore, Weissenberger, Lempio & Majestic

[57] ABSTRACT

A DC electrical motor of the form having one field winding connected in series with the armature winding in addition to a shunt field winding connected in parallel with the armature winding is provided with a diode or the like in the shunt field winding circuit. This blocks reversed current flow in the shunt field winding which can otherwise occur during start-up due to an inductive interaction with the series field winding and armature circuit. The diode or the like enables faster magnetization of the stator poles by preventing creation of negative shunt field ampere turns due to the magnetic couple with the series field-armature circuit during the motor start period. Faster starting of the motor results, and adverse effects such as heating, brush deterioration, and commutation problems are reduced.

6 Claims, 5 Drawing Figures

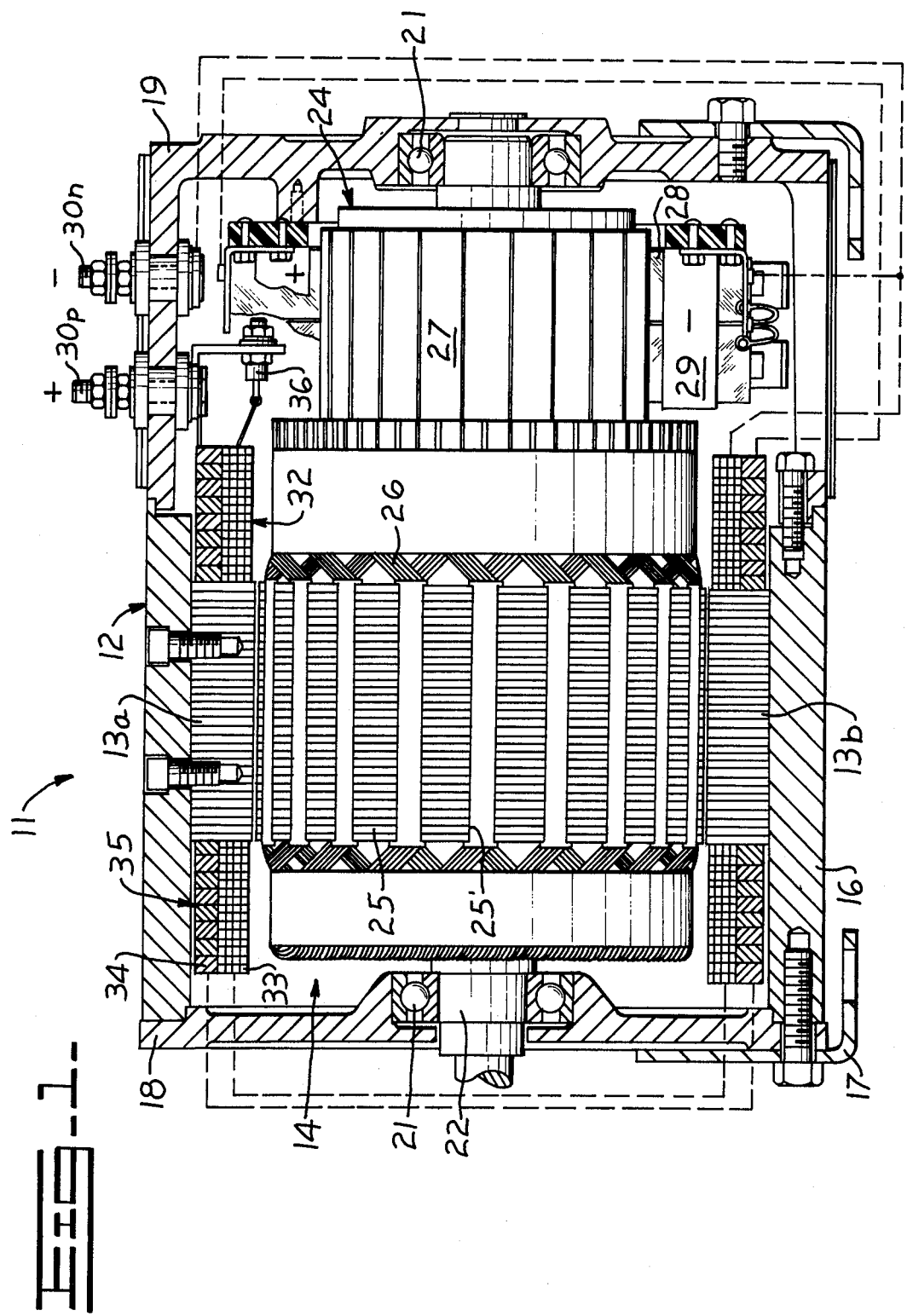

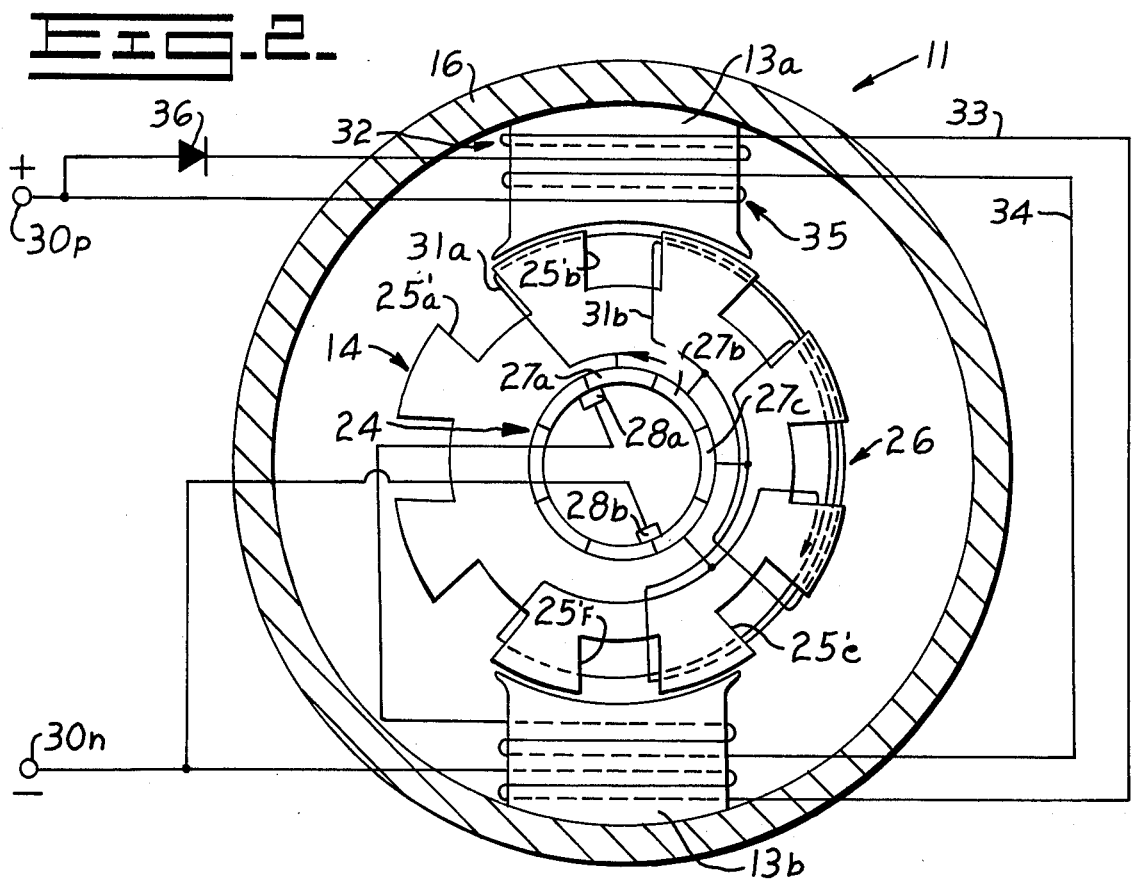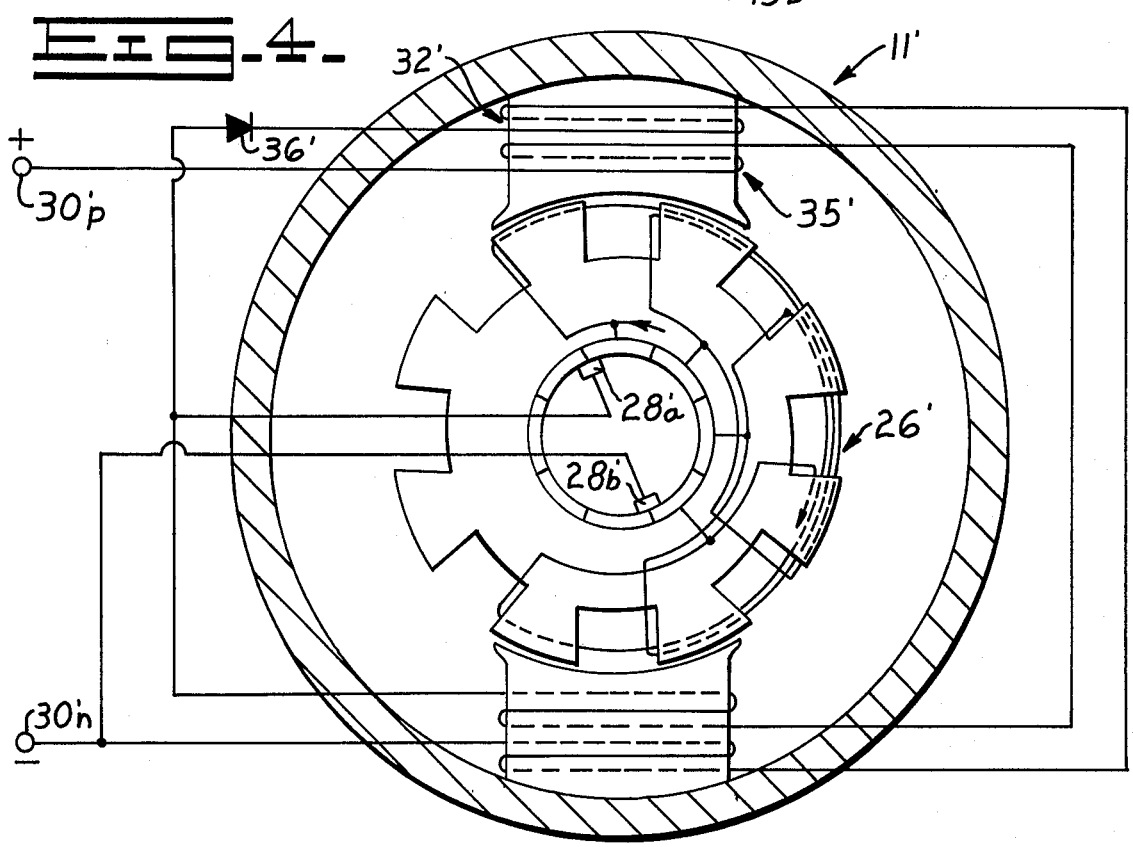

COMPOUND D.C. ELECTRICAL MOTOR WITH SHUNT FIELD DEMAGNETIZATION PROTECTION

BACKGROUND OF THE INVENTION

This invention relates to electrical motors, and more particularly to direct current electrical motors of the compound form which have one field winding connected in series with the armature winding, and another field winding connected in parallel therewith.

Most DC electrical motors have an armature disposed for rotation in the magnetic field of a stator, and include a commutator for transmitting current to the rotating armature winding. The stator magnetic field is established by one or more field windings. Motors of this general class may be subdivided into three basic types according to the nature of the interconnections between the armature windings and the field windings. The basic types are shunt motors, series motors, and compound motors, and each exhibits somewhat different operational characteristics.

A shunt motor in which the field winding is connected in parallel with the armature winding tends to produce a variable torque at a substantially constant speed and thus accommodates to variable loading conditions. In a series motor, the armature and field windings are connected in series which produces greater starting torque but causes both torque and speed to vary widely under changing loads. Compound motors have at least two field windings with one being in series with the armature winding, and the other being in parallel therewith. As a consequence, compound motors offer a compromise between the differing operational characteristics of shunt motors and series motors. A compound motor exhibits greater starting torque than a shunt motor while being less variable in speed under changing loading than in a series motor. As the relatively flat speed-torque curve is preferable in many electrical motor applications, compound motors are extensively used for driving diverse types of powered apparatus.

Considering now another aspect of electrical motors, it is well recognized that fast start-up is desirable, at least in most motor usages. Fast start-up is usually preferable not only to speed operation of the device being driven by the motor, but also to reduce the overheating and structural deterioration of the motor which tends to occur during the start-up period. In particular, an electrical motor has very little internal resistance to current flow when voltage is first applied to the motor terminals. Once the armature begins to turn, the motor inherently functions also as a generator producing a back EMF (electromotive force) that opposes and, in effect, reduces the voltage which is being applied to the motor terminals. The back EMF increases as armature rotation speeds up, and is eventually of sufficient magnitude to greatly reduce current flow through the motor. At the first instant of start-up, and for a brief period thereafter, the lack of normal back EMF allows extremely large current surges to flow through the windings and other conductors, including the brushes. These current surges during start-up cause severe heating, brush deterioration, power wastage, may interfere with proper commutation, and in general tend to reduce the operational life of the motor. If the motor is being operated from a battery, the abnormal current may also cause battery deterioration.

Thus, the working efficiency and durability of electrical motors, including compound DC motors, may be increased to the extent that faster start-up can be accomplished as this reduces the temporary periods of damagingly high current flow. This is a particularly important aspect of motor design where frequent starting and stopping of a motor is probable. The motor employed in electrohydraulic systems for controlling mast-tilting and fork-lifting functions of an industrial lift truck is one example of a motor usage where a compound motor is particularly desirable but in which frequent start-ups may be necessary, there being many diverse other examples of such motor applications known to those skilled in the art.

SUMMARY OF THE INVENTION

One of the inherent factors which tend to slow start-up of a conventional compound DC motor has not heretofore been recognized in the art. Specifically, in many compound motors the series field winding has a relatively small number of low resistance turns in comparison with the shunt field winding. Thus the shunt field winding has a comparatively long time constant. Consequently, when electrical power is first applied to such a motor, a heavy current flows through the armature and series winding circuit prior to the time that normal current flow can be established in the shunt field winding. As the two field windings are closely coupled inductively, the relatively high current in the armature and series field winding circuit tends to momentarily induce a reversed current flow in the shunt field winding. This retards the build-up of magnetization of the stator since the shunt field ampere turns subtract from the series field ampere turns. The result is an undesirable prolongation of the start-up period, an increase in armature current (a component of which establishes the negative shunt field current) and an aggravation of the undesirable effects hereinbefore discussed.

The present invention utilizes a diode or other unidirectional current means to block a reverse current of the kind discussed above in the shunt field winding. Start-up of the motor is thereby speeded, armature circuit current is reduced, shunt field negative ampere turns are eliminated and adverse effects, such as severe heating, brush damage and disturbance of commutation, are substantially reduced.

Accordingly, it is an object of this invention to provide for faster starting of compound direct current electrical motors.

It is another object of the invention to increase the operational life of compound electrical motors and to reduce maintenance requirements in connection with such motors.

It is another object of the invention to reduce heating of compound electrical motors by reducing the duration of excessively high current flow in such motors during starting transients.

It is still another object to substantially eliminate shunt field negative ampere turns during high transient conditions in an electrical motor by blocking reverse current flow in the shunt field winding.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is an axial section view of a compound direct current electrical motor embodying the invention, FIG. 2 is a diagrammatic view illustrating certain principal components of the motor of FIG. 1 including electrical connections between the several components thereof, FIG. 4 is a view essentially similar to FIG. 2 bur depicting an application of the invention to a compound DC electrical motor having a short shunt field winding connection as opposed to the long shunt arrangement of FIG. 2.

DESCRIPTION OF A PREFERRED EMBODIMENT

Figure 3A:
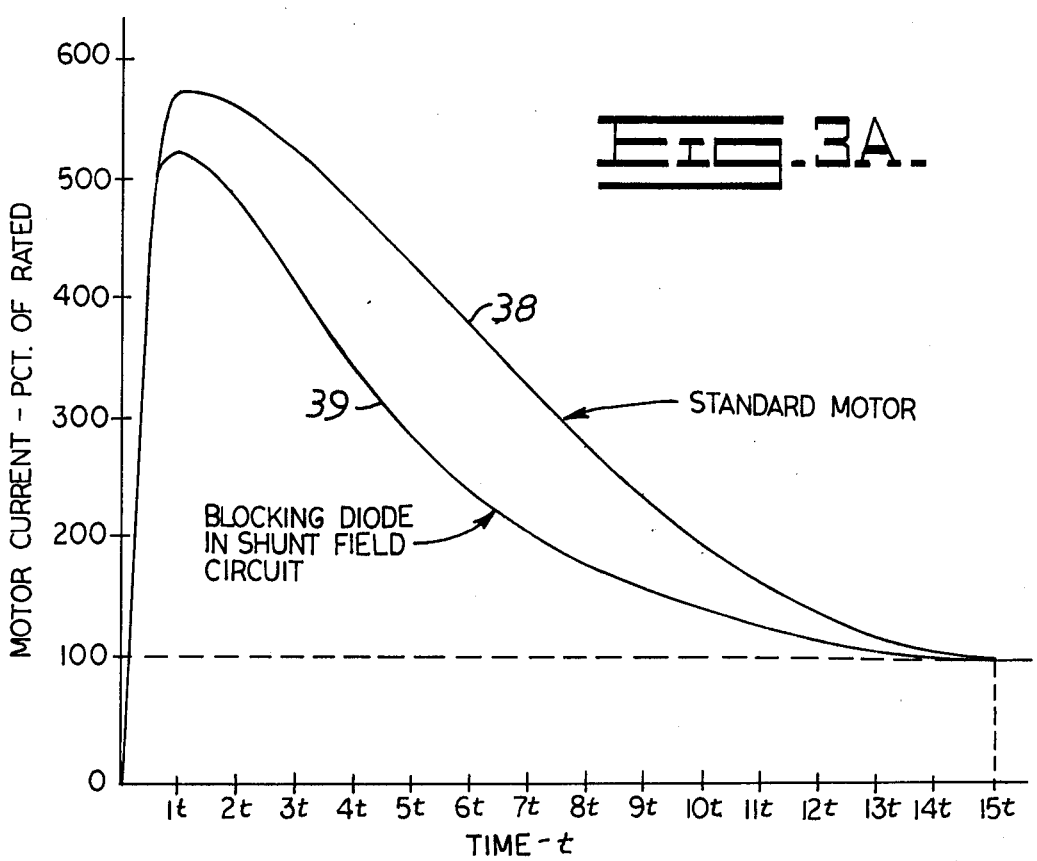
FIG. 3A is a graphical diagram depicting total motor current as a function of time in a representative motor embodying the invention and also in a typical prior art motor.

Referring now to FIG. 1, a compound DC electrical motor 11 typically has a stator 12 supporting magnetic pole pieces 13a and 13b and a rotatable armature assembly 14 situated between the pole pieces. For purposes of illustration, the invention will be herein described with reference to a motor 11 of the two-pole form, although in practice such motors are often constructed with additional sets of poles and the present invention is equally applicable to motors having more poles. Pole pieces 13 are secured to an annular yoke 16 which also forms the cylindrical outer casing of the motor. Poles 13 and yoke 16 are formed of iron or other ferromagnetic material and a mounting bracket 17 or the like may be secured to the outer surface of yoke 16 in order to attach the motor to a supporting structure.

A circular front end plate 18 and an annular back end housing 19, are secured to opposite ends of yoke 16 in coaxial relationship thereon, and each supports a bearing 21 into which the shaft 22 of armature 14 is journaled in order to support the armature for rotation within the magnetic field which extends between pole pieces 13a and 13b. One end of the armature shaft 22 extends for a distance outwardly from front end plate 18 in order to provide for coupling of the motor to a load which is to be driven, while the other end of the armature shaft extends axially through a commutator assembly 24 situated within end housing 19.

Armature 14 may be of conventional construction, and thus includes a cylindrical core 25 formed of iron or other ferromagnetic material which is supported coaxially on shaft 22 for rotation with the shaft. Core 25 is formed with a plurality of longitudinally extending slots 25' which are equiangularly spaced around the circumference of the core in order to receive an armature winding 26. The configuration of the armature winding 26 and the field windings 32 and 35 of the stator, including electrical connections to such elements, will be hereinafter discussed in more detail.

Commutator assembly 24 may also be of conventional construction, and thus includes a ring of conductive commutator segments or risers 27 carried on shaft 22 for rotation with the shaft, the segments 27 being electrically insulated from the shaft and from each other and being connected to the armature winding in a manner to be hereinafter described. The commutator assembly also includes a pair of brush holders 29 supporting brushes 28 which bear against opposite sides of the ring of commutator segments 27. As is understood within the art, additional pairs of brushes 28 are provided if additional pairs of field poles 13 are present. To provide for connection of the motor to a battery or other source of electrical energy, power terminals 30p and 30n are mounted on end housing 19.

Referring now to FIG. 2, the armature winding 26 may be of any of the known types which form a closed electrical circuit around the circumference of the armature and which is tapped, to connect with individual ones of the commutator segments 27, at angular intervals around the winding. The example depicted in FIG. 2 utilizes the simplex form of winding in which a winding conductor 31a extends from each commutator segment, such as segment 27a, along one of the slots 25'a of the armature core, and then back along another one of the slots 25'e to connect with the adjacent commutator segment 27b. Another one of the winding conductors 31b also connects to commutator segment 27b and extends along slot 25'b and then back along still another slot 25'f to connect with the next commutator segment 27c. The two slots 25' through which each conductor 31 extends are not adjacent slots so that the winding portions formed by the several conductors 31 overlap around the circumference of the armature. The above-described pattern of interconnection of adjacent commutator segments 27 by conductors 31 extending through armature slots 25' is repeated all the way around the armature to form the closed winding although not all conductors 31 are illustrated in FIG. 2 in order to avoid obscuring other structure.

The field windings include a shunt field winding 32 formed by a conductor 33 and a series field winding 35 formed by a conductor 34, a plurality of turns of both field winding conductors 33 and 34 being wound around both pole pieces 13a and 13b. One end of series field winding conductor 34 connects to one of the commutator brushes 28a, while the other end of conductor 34 is connected to the positive power supply terminal 30p. The other brush 28b is connected to negative power terminal 30n. One end of the shunt field winding conductor 33 is also connected to the negative power supply terminal 30n while the other end of conductor 33 is connected to the positive power supply terminal 30p through one or more diodes 36, the positive side of the diode being connected to the positive power supply terminal and the negative side of the diode being connected to the end of conductor 33. As shown in FIG. 1, diode 36 may be supported on positive terminal 30p within housing 19.

Referring again to FIG. 2, it may be seen that the series field winding 35 is connected between the power supply terminals 30 in series relationship with the armature winding 26 while the shunt field winding 32 is connected to the terminals 30 in parallel with the series field winding-armature winding circuit. As is understood by those skilled in the art, the series field winding 35 may have relatively few turns about the pole pieces 13 in comparison with the shunt field winding 32 depending on the operational characteristics which are desired for the motor. Also, while the series field winding 35 and shunt field winding 32 are shown separated on the pole pieces in FIG. 2 for clarity of illustration, in practice such windings may be physically intermixed although the two windings are insulated from each other by insulative varnish or the like on conductors 33 and 34.

In operation, the motor is started by connecting power terminals 30 to a source of direct current and is stopped by disconnecting the terminals from the power supply. Upon connection of terminals 30 with a DC power source, the resultant current flow through shunt field winding 32 and series field winding 35 creates a magnetic field which extends between pole pieces 13 through the armature 14. A current also flows from positive terminal 30p through series field winding 35 to brush 28a, then through the one or ones of the commutator segments 27 in contact with brush 28a at that time, then through the conductors 31 of the armature winding to the commutator segments 27 which are in contact with the other brush 28b at that time, and then to the negative terminal 30n. The current flow through the armature winding 26 tends to produce a magnetic field in quadrature to that produced by the stator. This, in turn, causes the armature 14 to turn in a direction which would bring the armature field into alignment with that of the stator, but such alignment cannot occur owing to the action of the commutator which continually maintains the armature field in quadrature to the stator field. Thus the armature 14 continually revolves as long as power continues to be applied to terminals 30 and the motor is not overloaded.

A variety of adverse effects occur during the start-up period which is the interval between the time that voltage is first applied to power terminals 30 and the time that the armature speed reaches the normal operating range, such effects and the cause of these effects having been hereinbefore described. The adverse effects which occur during motor start-up can be minimized to the extent that the duration of the start-up period can be reduced. In other words, it is desirable that the armature speed rise as rapidly as possible. We have discovered that an effect is present in conventional compound DC motors, which has not heretofore been recognized, and which tends to prolong the start-up period unnecessarily. In particular, in most compound motors the armature winding-series field winding circuit has a comparatively short time constant in relation to the shunt field winding circuit. The resistance, capacitance and self-inductance of the armature winding-series field winding circuit are considerably smaller than the corresponding characteristics of the shunt field winding circuit with the result that current flow increases much more rapidly in the armature and series field winding than it does in the shunt field winding. However, the series field winding and the shunt field winding are inherently closely coupled inductively. Thus, a transformer action can occur in which the rapidly rising current in the series field winding 35 induces an oppositely directed current flow in the shunt field winding 32. This induced reverse current flow in the shunt field winding opposes the current being applied externally through the power terminals 30 and thus retards magnetization of the stator. This in turn delays acceleration of the armature which results in prolongation of the start-up period and intensification of the several adverse effects which occur at that time.

Having recognized that the start-up of compound DC motors has been adversely affected by this phenomenon, we have overcome the problem by providing means for blocking reverse current flow in the shunt field winding, such means being the diode 36 in this example. By blocking reverse induced current flow in the shunt field winding, more rapid magnetization of the stator poles is effected by counteracting the effect described above.

The advantage gained by providing one or more diodes 36 or the like in the shunt field winding may be seen by reference to FIG. 3A taken from light beam oscillograph traces in the course of actual tests of a motor. In FIG. 3A curve 38 is the measured current flow through a typical conventional compound DC motor, in percent of rated current as a function of time (t), wherein the motor lacked the demagnetization protection of the present invention. Curve 39 shows the corresponding start-up current flow in the same motor when provided with a unidirectional current device in the shunt field winding in accordance with the present invention.

Figure 3B:
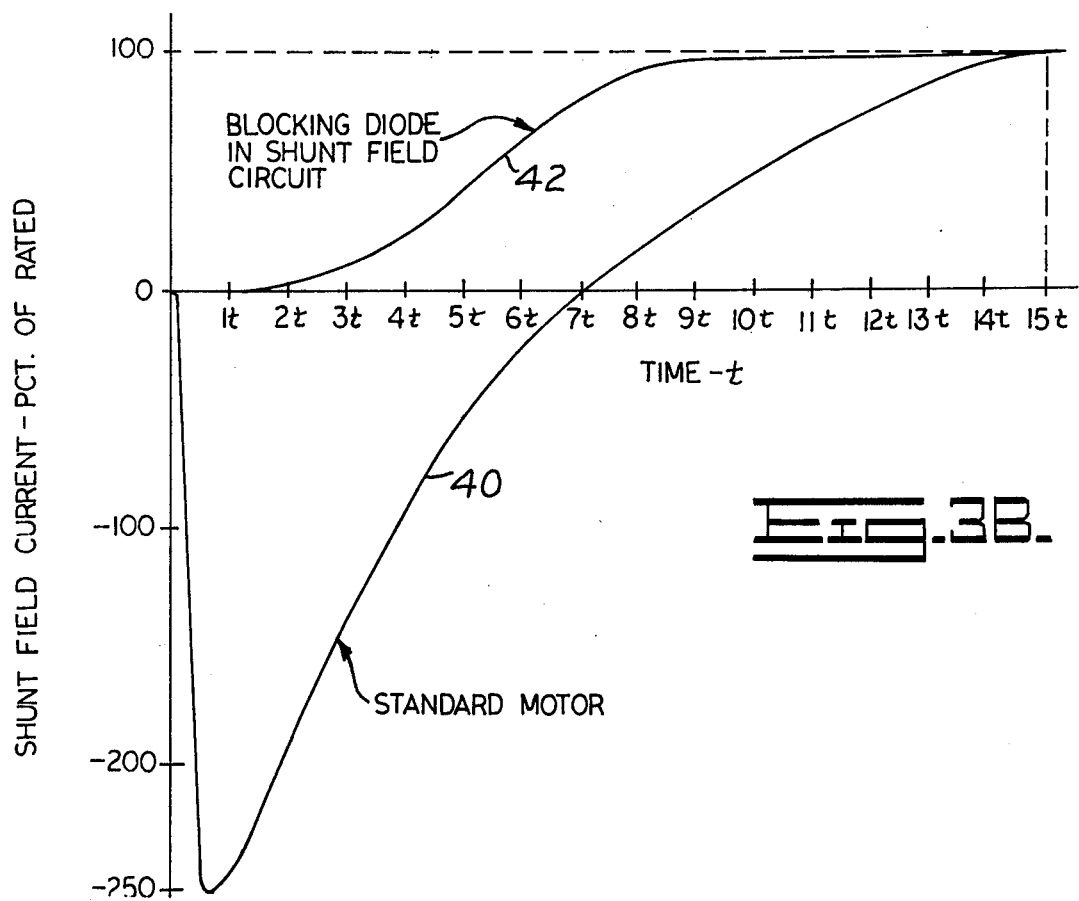
FIG. 3B is a graphical diagram depicting shunt field winding current as a function of time in the two motors of FIG. 3A.

The effect of providing one or more diodes 36 or the like in the shunt field circuit is further demonstrated in FIG. 3B, also taken from light beam oscillograph traces in the course of actual tests of the motor. In FIG. 3B curve 40 is the measured current flow in the shunt field of a typical compound DC motor, in percent of rated shunt field current as a function of time (t), wherein the motor lacked the demagnetization protection of the present invention. Curve 40 illustrates that, during the period of high inrush current associated with motor starting, a relatively high negative current flow exists in the shunt field circuit. This results in the establishment of negative ampere turns in the shunt field which subtract from the series field ampere turns, retarding magnetization of the stator and prolonging the motor start-up period. Curve 42 shows the corresponding shunt field current flow during start-up of the same motor when provided with a unidirectional current device in the shunt field winding in accordance with the present invention. It will be noted that negative current at no time exists in the shunt field. Rather, the current builds up in a positive direction starting early in the motor start-up period.

Thus the shunt field demagnetization protection means, such as diode 36, of the present invention very significantly decreases starting current in a motor in relation to the conventional uncorrected motor, and does so with very little structural complication or added cost.

It should be understood that the invention is applicable to forms of compound DC motor other than the specific type described above as illustrative of a representative usage of the invention. For example, the motor arrangement as described with reference to FIG. 2 is of the long shunt type in which the shunt field winding 32 is connected in parallel with both the series field winding 35 and the armature winding 26. FIG. 4 depicts an adaptation of the invention to a compound DC motor 11' of the short shunt type in which shunt field winding 32' is connected in parallel only with the armature winding 26' while being connected in series with the series field winding 35'.

In particular, one end of the shunt field winding 32' and one commutator brush 28b' may be connected to a power terminal 30n'. Series field winding 35' is connected between the other power terminal 30p' and the other brush 28a'. In the short shunt arrangement, the other end of the shunt field winding 32' connects to the other brush 28a' through the diode 36' or like unidirectional current device.

While the invention has been described with respect to specific embodiments, it will be apparent that many modifications are possible, and it is not intended to limit the invention except as defined in the following claims.

What is claimed is:

1. In a compound DC electrical motor having a rotatable armature with at least one armature winding and having a stator with at least one series field winding connected in series relationship with said armature winding, said stator also having at least one shunt field winding connected in parallel relationship with said armature winding and wherein inductive coupling is present between said series field winding and said shunt field winding, the improvement comprising at least one unidirectional current means for limiting current flow in said shunt field winding to flow in a single direction.

2. The combination defined in claim 1, wherein said unidirectional current means comprises at least one diode connected in series with said shunt field winding and in parallel with said series field winding.

3. The combination defined in claim 1 further comprising a pair of power terminals for connection to a source of direct current, and commutator means including at least a pair of brushes for transmitting current to said armature winding, wherein one end of said shunt field winding and one of said brushes are connected to one of said power terminals, said series field winding is connected between the other of said terminals and the other of said brushes, and the other end of said shunt field winding is connected to said other of said terminals through said unidirectional current means.

4. The combination defined in claim 1 further comprising a pair of power terminals for connection to a source of direct current, and commutator means including at least a pair of brushes for transmitting current to said armature windings wherein one end of said shunt field winding and one of said brushes are connected to one of said power terminals, said series field winding is connected between the other of said terminals and the other of said brushes, and the other end of said shunt field winding is connected to said other brush through said unidirectional current means.

5. A compound direct current electrical motor comprising:
 a stator having a series field winding and a shunt field winding for producing a magnetic field in response to current flow through said windings and wherein inductive coupling is present between said series field winding and said shunt field winding;
 an armature disposed for rotation in said magnetic field of said stator and carrying an armature winding;
 first and second power input terminals for connection to a source of direct current to energize said motor;
 commutation means for connecting said series field winding and said armature winding to said terminals in series relationship;
 conductor means for connecting said shunt field winding in parallel relationship with said armature winding; and
 means for limiting current flow in said shunt field winding to flow in a single predetermined direction therethrough.

6. The combination defined in claim 5, wherein said commutator means comprises a plurality of conductive commutator segments arranged in an annular band on said armature for rotation therewith and at least first and second brushes disposed to contact spaced-apart portions of said annular band of commutator segments, and wherein said armature winding comprises a plurality of conductor segments each having opposite ends connected to separate ones of said commutator segments, said conductor segments being angularly spaced around the circumference of said armature, and wherein said first brush is connected to said first power terminal and said second brush is connected to said second power terminal through said series field winding, and wherein said means for limiting current flow comprises at least one diode connected in series relationship with said shunt field winding.

* * * * *

UNITED STATES PATENT OFFICE
CERTIFICATE OF CORRECTION

Patent No. 4,080,556　　　　　　　　　　Dated March 21, 1978

Inventor(s) FRANK S. BUCHWALD and WARD L. BIVENS

It is certified that error appears in the above-identified patent and that said Letters Patent are hereby corrected as shown below:

The designation of the Assignee should read:

--Towmotor Corporation, Mentor, Ohio--

Signed and Sealed this

Twenty-second Day of August 1978

[SEAL]

Attest:

RUTH C. MASON
Attesting Officer

DONALD W. BANNER
Commissioner of Patents and Trademarks